United States Patent
Tellson

[15] 3,694,043
[45] Sept. 26, 1972

[54] RETAINING RING AND CAGE FOR UNIT ASSEMBLY OF TAPERED BEARING COMPONENTS

[72] Inventor: Joseph W. Tellson, Sandusky, Ohio
[73] Assignee: General Motors Corporation, Detroit, Mich.
[22] Filed: July 26, 1971
[21] Appl. No.: 165,954

[52] U.S. Cl. ..................................308/214, 308/218
[51] Int. Cl. ..........................F16c 33/00, F16c 33/46
[58] Field of Search..............................308/214, 218

[56] References Cited

UNITED STATES PATENTS 2,435,839   2/1948   McNicoll...................308/218

Primary Examiner—Martin P. Schwadron
Assistant Examiner—Frank Susko
Attorney—J. L. Carpenter et al.

[57] ABSTRACT

A tapered roller bearing having a non-shouldered outer race, an inner race with a shoulder at its large diameter end, a cage having roller pockets to receive rollers and a ring having radially projecting tangs thereon extending from an annular skirt with the tangs positioned to snap into locking engagement with suitable notches located at the large end of the roller pockets in the cage.

4 Claims, 5 Drawing Figures

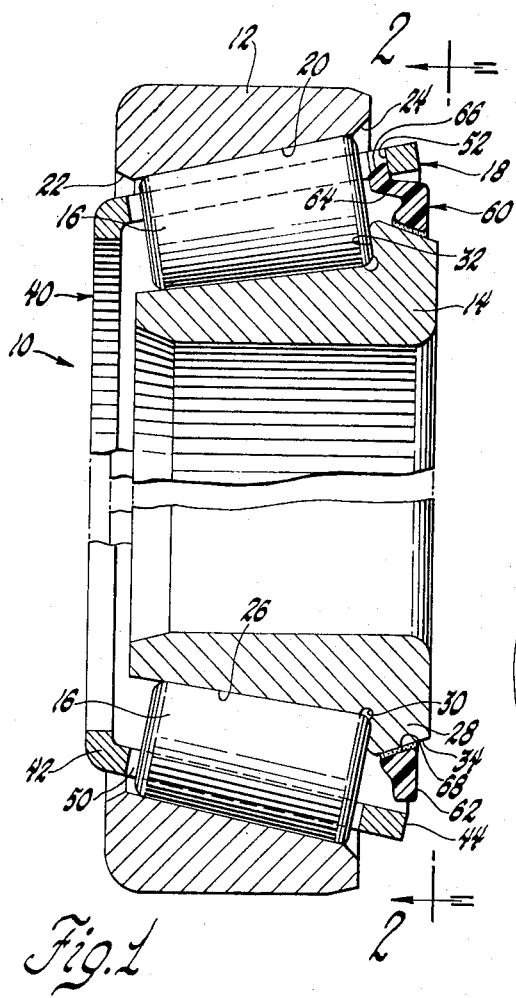

RETAINING RING AND CAGE FOR UNIT ASSEMBLY OF TAPERED BEARING COMPONENTS

This invention relates generally to tapered roller bearings and more specifically to a tapered roller bearing provided with a two-piece cage including a separator and a retaining ring which snaps onto the separator and cooperates therewith.

Most conventional tapered roller bearings consist of a double shouldered inner race, a sheet metal "over-center" cage and a complement of rollers which are assembled by the well-known "bump" method as illustrated in U.S. Pat. No. 1,444,326 issued on Feb. 6, 1923 to Tracy V. Buckwalter. In the "bump" method, the cage crossbars are first deformed to allow the rollers of the bearing to pass over the small diameter shoulder of the inner race and then the crossbars are straightened to provide an assembly of the cage and rollers. An unshouldered outer race is normally provided as a separate piece.

An improvement over this conventional tapered roller bearing structure was disclosed in U.S. Pat. No. 3,477,773 issued Nov. 11, 1969 to Ralph Altson. This patent disclosed a tapered roller bearing structure having a non-shouldered outer race, an inner race with a shoulder at its larger diameter end and a single piece molded cage to retain the rollers, with the cage being provided with radial projections on its small diameter end ring to cooperate with the outer race and radial projections on its large diameter end ring to cooperate with the shoulder on the inner race to provide a unit handled assembly.

In the bearing structure disclosed in the above-identified U.S. Pat. No. 3,477,773 the bearing is assembled by first snapping the rollers into the windows of the bearing cage from the inside of the cage and then this cage and roller assembly is moved axially onto the inner race from the smaller diameter end of the inner race. In this structure, the radial projections plus the outer ring of the cage must be sufficiently flexible to allow temporary deformation of these elements to permit the cage to be snapped into retained position onto the inner race and to permit the outer race to be assembled thereto.

Thus, in the prior known bearing structures, as exemplified in the above-identified patents, some deformation of the bearing cage was required to effect assembly of the various bearing components.

It is therefore the principal object of this invention to improve a bearing cage structure for use in a roller bearing which readily permits the assembly of rollers into the bearing cage and the assembly of these rollers and cage onto the inner race of the bearing.

Another object of this invention is to improve a bearing cage structure for use in a roller bearing assembly whereby the cage structure is easily manufactured and then assembled with other components of the bearing without any deformation of the roller separator components of the cage since elimination of any deformation of these components of the cage negates the introduction of stresses and other weakening characteristics to the cage.

These and other objects of the invention are attained by means of a tapered roller bearing structure in which the thrust shoulder is removed from the small diameter end of the inner race or cone and in which a two-piece cage assembly including a separator cage receiving the rollers is held in assembly with the inner race by either a plastic or a sheet metal retaining ring which snaps onto the separator cage and cooperates with a tapered surface on the inner race thrust rib at the larger diameter end thereof to retain this assembly on the inner race.

For a better understanding of the invention, as well as other objects and further features thereof, reference is had to the following detailed description of the invention to be read in connection with the accompanying drawings wherein:

FIG. 1 is a sectional view of a roller bearing provided with a cage assembly in accordance with the invention;

FIG. 2 is a reduced view taken along line 2—2 of FIG. 1;

FIG. 3 is an exploded perspective view of the two-piece cage assembly of the invention;

FIG. 4 is a partial sectional view of a tapered roller bearing provided with another form of cage assembly constructed in accordance with the invention; and, FIG. 5 is a perspective view of the retaining ring used in the structure of FIG. 4.

Referring now to FIGS. 1, 2 and 3, a tapered roller bearing, indicated generally at 10, comprises an outer race 12, an inner race 14 and a complement of tapered rollers 16 disposed between the outer race 12 and inner race 14 and retained in spaced apart position by a cage 18 constructed in accordance with the invention.

The outer race 12 has no shoulders and its inner circumferential surface includes a tapered pathway 20, the smaller diameter of which is contiguous with a frusto-conical surface 22 which has a taper opposite to that of the pathway 20 and a frusto-conical surface 24 at the opposite end. The inner race or bearing cone 14 includes a tapered pathway 26 on its outer circumference. The large diameter end of the inner race 14 includes a cone back face rib or thrust shoulder 28. A circumferential undercut 30 is provided at the juncture of the radial face 32 of the shoulder 28 with the pathway 26 to facilitate grinding of both the raceway and the shoulder. The outer circumferential surface 34 of the shoulder 28 tapers oppositely to the taper of the pathway 26.

The cage 18 comprises an assembly of a separator cage 40 and a retaining ring 60. The separator 40, which may be made of metal or other suitable material, comprises a small diameter shouldered end ring 42 and a large diameter end ring 44 connected by a number of integral separator crossbars 46 which, together with the end rings, form windows 48 which individually receive the rollers 16. The side walls 50 of the separator crossbars 46 are tapered radially inward to provide retaining surfaces for the rollers 16. Thus, the inner circumferential width of each window 48 is greater than the outer circumferential width of the window to limit radial outward movement of a roller placed therein whereby the bearing cone 14, rollers 16 and cage 18 can be handled as a unit assembly.

With the construction of the separator cage 40, as shown and described, there is provided an open ended structure into the windows 48 of which the rollers 16 can be readily inserted and then mounted onto the inner race or bearing cone after which these elements can be retained in their relative positions with respect to each other by means of a suitable retaining ring used to partly close the open end of the separator cage 40, means being provided to releasably secure the retaining ring to the separator cage.

In the embodiments disclosed, and with particular reference to the embodiment shown in FIGS. 1, 2 and 3, the retaining ring 60, made of suitable plastic material, includes an annular ring 62 having axially extending tangs 64 formed integral therewith which are adapted to engage into notches 52 provided for this purpose in the large diameter end ring 44 of the separator cage 40 adjacent to the windows 48 therein. The tangs 64, each with an angled leading edge 66 at its radially outward extending free edge portion, are positioned to snap into locking engagement with the notches 52 in the separator cage 40 by resiliently flexing to clear the inner diameter of the end ring 44, the edge 66 serving to cam the tang radially inward as it engages the end ring 44 during assembly of the retaining ring 60 to the separator ring 40.

The inner diameter surface 68 of the retaining ring 60 is at an angle complementary to the angled surface 34 of the cone back face rib or shoulder 28 outer diameter of the bearing cone 14. The maximum diameter of the retaining ring inner diameter surface 68 is smaller than the outside diameter of the cone back face rib or shoulder 28, that is, the diameter represented by angled surface 34. The difference in these diameters forms a diametral interference in such a manner that when the separator cage 40, rollers 16, and retaining ring 60 move in an axial direction, to the left as seen in FIG. 1, away from the cone back face rib or shoulder 28, the inner diameter surface 68 of the retaining ring 60 comes into contact with the surface 34 on the shoulder 28 to thus restrict further axial movement of the cage 18 and rollers 16 and thus maintain cage 18, rollers 16 and bearing cone 14 as an integral assembly.

In the embodiment shown in FIGS. 4 and 5, the retaining ring 60a, in the form of a stamped metal ring, includes an annular ring 62a having axially and radially outward extending tangs 64a which are positioned to snap into locking engagement with the notches 52 in the separator cage 40 by resiliently flexing to clear the inner diameter of end ring 44 of the separator cage. As shown, the tangs 64a are substantially S-spring shaped to permit flexing of the tangs during insertion of this ring into the open end of the separator cage, the leading edge 66a of each tang being received to facilitate downward camming action on the tang during insertion into the separator cage. In a manner similar to that in retaining ring 60 and to serve the same function as previously described, the inner surface 68a of the annular ring 62a is inclined at an angle complementary to the angled surface 34 of the cone back face rib or shoulder 28 of bearing cone 14. As shown, the outer diameter surface 70a of the annular ring 62a is substantially parallel to surface 68a whereby the annular ring 62a is in the form of an annular segment of a truncated cone.

It is to be realized that although only one form of the retaining ring 60a has been shown as an example, the configuration of the tangs 64a may be designed so as to provide suitable spring pressure between the inner diameter surface of the end ring 44 of separator cage 40 and the outside diameter surface of the tangs 64a to provide positive radial location of the annular ring 62a of the retaining ring 60a relative to the separator cage 40.

The invention shown and described thus consists of a cage retaining ring with several suitably designed tangs or arms having spring action which will permit them to snap into suitably designed retaining notches in the large diameter ends of the separator cage roller pockets. In addition, the inner diameter surface of the retaining ring and the outer diameter surface of the cone back face rib or cone shoulder are designed in such a manner that the retaining ring inner diameter surface in whole or in part has a smaller diameter than the outside diameter of cone back face rib or shoulder. The retaining ring inner diameter surface and the cone back face rib outer diameter surface are additionally designed so that, when all components of the tapered bearing are in their normal operating positions relative to each other, there will be limited but adequate radial and axial clearance between the retaining ring and the cone back face rib.

The configurations of the separator cage, cage retaining ring and the bearing cone provide the means, when these components are assembled with a complement of rollers, of retaining the cage and rollers integral with the cone as a non-separable, unit-handled assembly. The outer race, until complete assembly, is handled as a separate piece, but would be included in a common bearing package with the above-described unit-handled assembly. In final assembly of the bearing, the outer race 12 is assembled over the rollers 16 and cage 18 by sliding it axially thereover from the smaller diameter end of the rollers.

What is claimed is:

1. A tapered roller bearing comprising in combination an inner race having a first tapered pathway and a thrust shoulder at its larger diameter end, said thrust shoulder having a frusto-conical outer diameter surface tapered oppositely to said first tapered pathway, an outer race having a second tapered pathway, a plurality of tapered rollers disposed between and in frictional engagement with said first tapered pathway and said second tapered pathway, a cage for circumferentially spacing said rollers and for limiting movement of said rollers axially with respect to said inner race, said cage comprising a separator cage open at one end and having a shouldered small diameter end ring and a large diameter end ring forming said open end with crossbars extending therebetween to form windows adapted to individually receive said rollers, said large diameter end ring having circumferentially spaced notches therein adjacent to said windows, and a retaining ring positioned within said large diameter end ring to partly close the open end of said separator cage, said retaining ring including flexible tangs extending axially therefrom for engagement into said notches, said retaining ring having an inner diameter surface which cooperates with said frusto-conical outer diameter surface to limit the axial movement of said cage and said rollers with respect to said inner race.

2. A tapered roller bearing according to claim 1 wherein said retaining ring includes an annular ring of plastic material having an outer diameter less than the inside diameter of said large diameter end ring, said flexible tangs, integral with said annular ring, each having an angled edge at its radially outward extending free edge.

3. A tapered roller bearing according to claim 1 wherein said retaining ring includes a stamped metal annular ring in the form of an annular segment of a truncated cone and wherein said tangs, integral with said annular cone, are substantially S-spring shaped to permit their flexing during insertion of the retaining ring into the open end of said separator cage.

4. A non-separable, unit-handled bearing subassembly comprising in combination an inner race having a tapered pathway and a thrust shoulder at its larger diameter end, said thrust shoulder having a frusto-conical outer diameter surface tapered oppositely to said tapered pathway, a plurality of tapered rollers, a cage for circumferentially spacing said rollers and for limiting movement of said rollers axially and radially with respect to said inner race, said cage comprising a separator cage open at one end and having a shouldered small diameter end ring and a large diameter end ring forming said open end with radially inward tapered crossbars extending therebetween to form tapered windows adapted to individually receive said rollers and retain them in engagement with said tapered pathway, said large diameter end ring having circumferentially spaced notches therein adjacent to said windows, and a retaining ring positioned within said large diameter end ring to partly close the open end of said separator cage, said retaining ring including flexible tangs extending into engagement with said notches, said retaining ring having an inner diameter surface which cooperates with said frusto-conical outer diameter surface to limit the axial movement of said cage and said rollers with respect to said inner race.

* * * * *